US012775080B2

(12) United States Patent
Sievers et al.

(10) Patent No.: US 12,775,080 B2
(45) Date of Patent: Oct. 27, 2026

(54) TEST SYSTEM FOR A LiDAR SENSOR AND METHOD FOR TESTING A LiDAR SENSOR

(71) Applicant: dSPACE GmbH, Paderborn (DE)

(72) Inventors: Gregor Sievers, Paderborn (DE); Frank Schuette, Paderborn (DE); Jens Hagemeyer, Bielefeld (DE); Jan Lachmair, Bielefeld (DE); Dirk Jungewelter, Bielefeld (DE)

(73) Assignee: dSpace GmbH, Paderborn (DE)

( * ) Notice: Subject to any disclaimer, the term of this patent is extended or adjusted under 35 U.S.C. 154(b) by 1236 days.

(21) Appl. No.: 17/695,147

(22) Filed: Mar. 15, 2022

(65) Prior Publication Data

US 2022/0291364 A1 Sep. 15, 2022

(30) Foreign Application Priority Data

Mar. 15, 2021 (DE) ..................... 10 2021 106 218.7

(51) Int. Cl.
*G01S 7/51* (2006.01)
*G01S 17/89* (2020.01)

(52) U.S. Cl.
CPC ................ *G01S 7/51* (2013.01); *G01S 17/89* (2013.01)

(58) Field of Classification Search
CPC .......... G01S 7/51; G01S 17/89; G01S 17/931; G01S 7/497; G01S 17/08; G01S 7/4911; G01S 17/93; H03M 1/66
See application file for complete search history.

(56) References Cited

U.S. PATENT DOCUMENTS 8,797,512 B2 * 8/2014 Stettner ................. G01S 7/4818 356/9
9,110,154 B1 * 8/2015 Bates ...................... G01S 17/08
10,345,447 B1 * 7/2019 Hicks ...................... G01S 17/86
10,955,533 B2 3/2021 Konrad
11,086,198 B2 * 8/2021 Van Der Sijde ..... H04N 25/531
11,353,551 B2 6/2022 Konrad
11,988,775 B1 * 5/2024 Waschura ............. G01S 7/4815
2010/0283413 A1 * 11/2010 Richter ................ H04N 9/3129 315/360
2011/0019154 A1 1/2011 Jennings et al.

(Continued)

FOREIGN PATENT DOCUMENTS

DE 102007057372 A1 5/2009
DE 102017110790 A1 11/2018

(Continued)

OTHER PUBLICATIONS

Japanese Office Action dated Mar. 3, 2023 in corresponding application 2022-039324.

(Continued)

*Primary Examiner* — Mohammad K Islam
(74) *Attorney, Agent, or Firm* — Muncy, Geissler, Olds & Lowe, P.C.

(57) ABSTRACT

A test system for a LiDAR sensor, which comprises a trigger detector and a signal generator connected to the trigger detector, the signal generating unit including a display panel having a predefined number of pixels, and the signal generator being configured to aggregate pixels of the same intensity into a cluster. A method for testing a LiDAR sensor is also provided.

18 Claims, 4 Drawing Sheets

(56) References Cited

U.S. PATENT DOCUMENTS

| | | | | |
|---|---|---|---|---|
| 2015/0234039 | A1* | 8/2015 | Bates | G01S 7/497<br>356/6 |
| 2018/0329065 | A1* | 11/2018 | Pacala | G01S 7/4865 |
| 2019/0129009 | A1* | 5/2019 | Eichenholz | H03K 17/74 |
| 2019/0154836 | A1* | 5/2019 | Campbell | G01S 17/08 |
| 2020/0191963 | A1* | 6/2020 | Campbell | G01S 17/10 |
| 2021/0055387 | A1* | 2/2021 | LaChapelle | G01S 7/4865 |
| 2021/0112647 | A1* | 4/2021 | Coleman | H05B 47/1985 |
| 2021/0333366 | A1* | 10/2021 | Druml | G01S 7/4817 |
| 2021/0356570 | A1* | 11/2021 | daSilva | G01S 17/10 |
| 2021/0357552 | A1* | 11/2021 | daSilva | G01S 7/497 |
| 2021/0373136 | A1* | 12/2021 | Jiang | G01S 17/931 |
| 2022/0026546 | A1 | 1/2022 | Aono et al. | |
| 2022/0206117 | A1* | 6/2022 | Qiu | B60R 16/023 |
| 2023/0266473 | A1* | 8/2023 | Loot | G01S 17/931<br>356/21 |
| 2023/0273301 | A1* | 8/2023 | Engelbert | G01S 7/497<br>356/4.01 |

FOREIGN PATENT DOCUMENTS

| | | | | |
|---|---|---|---|---|
| DE | 102018111709 | A1 | 11/2018 | |
| DE | 102019106129 | A1 | 5/2020 | |
| DE | 102019118039 | A1 | 1/2021 | |
| DE | 102019121552 | A1 * | 2/2021 | G01S 7/497 |
| EP | 3936890 | A1 * | 1/2022 | G01S 17/10 |
| WO | WO2020059568 | A1 | 3/2020 | |
| WO | WO-2021005105 | A1 * | 1/2021 | H04N 23/71 |
| WO | WO-2021193646 | A1 * | 9/2021 | H04N 23/74 |

OTHER PUBLICATIONS

Extended European Search Report dated Aug. 12, 2022 in corresponding application 22159467.4.

* cited by examiner

TEST SYSTEM FOR A LiDAR SENSOR AND METHOD FOR TESTING A LiDAR SENSOR

This nonprovisional application claims priority under 35 U.S.C. § 119(a) to German Patent Application No. 10 2021 106 218.7, which was filed in Germany on Mar. 15, 2021, and which is herein incorporated by reference.

BACKGROUND OF THE INVENTION

Field of the Invention

The present invention relates to a test system for a LiDAR sensor. The present invention furthermore relates to a method for testing a LiDAR sensor.

Description of the Background Art

In addition to other applications, LiDAR (abbreviation for light detection and ranging) light measuring systems are used for the optical measurement of distance and speed. LiDAR light measuring systems emit light and measure the travel time in which the light returns to the LiDAR light measuring system after being reflected on an object. The distance of the object from the LiDAR light measuring system results from the known speed of the light.

Examples of application areas of LiDAR light measuring systems are mobile instruments for optical distance measurement and LiDAR light measuring systems for the field of automotive applications, namely driver assistance systems and autonomous driving as well as for aerospace applications.

DE 102007057372 A1 discloses a test system for LiDAR sensors, which includes a trigger unit, by means of which a signal generator is controlled in response to the receipt of a signal of a LiDAR sensor to be tested, in such a way that a predefined, artificially generated or recorded optical signal is output by a signal generating unit of the signal generator.

DE 102017110790 A1, which corresponds to U.S. Pat. No. 10,955,533, discloses a simulation device for a LiDAR light measuring system, which includes a LiDAR light receiving sensor, a light emitter being present in the plane of the LiDAR light receiving sensor, a further light emitter being arranged next to the light emitter in the plane of the LiDAR light receiving sensor, and a computer monitoring the activation of the LiDAR light receiving sensor and the period of time until a light signal is output via the light emitter and/or the further light emitter and registering the signal input of the light signal from the light emitter or the further light emitter.

A problem in testing LiDAR sensors using a signal generator is that the pixel resolution of a signal generating unit of a signal generator is conventionally very low. Complex scenes having a plurality of objects of different distances as well as different intensities may therefore not be simulated in a detailed manner.

SUMMARY OF THE INVENTION

It is therefore an object of the invention to improve existing devices and methods for testing a LiDAR sensor so that they permit a detailed simulation and simultaneously an efficient use of hardware resources.

The invention relates to a test system for a LiDAR sensor. The test system comprises a trigger detector and a signal generator connected to the trigger detector.

In response to the receipt of a trigger signal of a LiDAR sensor to be tested, the signal generator is controlled by the trigger detector in such a way that a predefined, artificially generated optical signal, in particular an artificially generated reflection of the trigger signal, is output by a signal generating unit of the signal generator.

The signal generating unit includes a display panel having a predefined number of pixels. The signal generator is furthermore configured to aggregate pixels of the same intensity into a cluster.

The invention furthermore relates to a method for testing a LiDAR sensor. The method comprises a provision of a trigger detector and a signal generator connected to the trigger detector.

In addition, the method comprises a provision of a display panel of a signal generating unit of the signal generator, which has a predefined number of pixels.

Moreover, the method comprises a control of the signal generator by the trigger detector in response to the receipt of a signal of a LiDAR sensor to be tested, in such a way that a predefined, artificially generated optical signal, in particular an artificially generated reflection of a LiDAR sensor signal, is output by the signal generating unit of the signal generator.

The method further includes an aggregation of pixels of the same intensity into a cluster, using the signal generator.

An idea of the present invention is to assign LiDAR over-the-air (OTA) pixels of a display panel, i.e. emitters or light transmitting units of the OTA test system, to dynamically different intensities, i.e. to aggregate them into groups of different intensities. A greater number of pixels per control chip is thus to be connected than the number of existing intensity elements, i.e. digital/analog converters.

In particular, the number of the intensity elements and, above all, the control thereof, is a limiting factor in the implementation of LiDAR over-the-air test systems. Due to the dynamic aggregation of LiDAR OTA pixels into groups having the same intensity, the integration density of the overall system may thus be significantly increased while simultaneously saving costs.

Regions having a higher resolution requirement and many objects to be represented may be shown in an individually controllable manner, using many pixels (for example, the edge of the road with many cars, trees and people). The available intensity resources may thus be dynamically assigned to these regions.

Regions having low resolution requirements are then shown at a reduced resolution, e.g., a larger surface with an identical reflection behavior, such as a superstructure of a truck trailer, or reflections from distant objects, which may not be distinguished from each other by the sensor in terms of their intensity, due to the low light quanta arriving at the sensor. This resolution requirement may be adapted per scene with a sufficient rate of change, i.e., the LiDAR pixels of the test system may be aggregated dynamically.

A cluster or pixel aggregation cluster (PAC) therefore combines a partial image region. Uniform intensities may be generated in this partial region for pixels having the same distances, the intensity of the pixels being variable for other distances within a scene (for example, for partially concealed objects situated behind each other). In addition, each of the pixels of a partial region may remain optionally switched off for each distance to ensure different object shapes for different distances.

Further specific embodiments of the present invention are the subject matter of the further subclaims and the following description, with reference to the figures.

According to one preferred refinement of the invention, it is provided that the signal generator includes a plurality of circuit boards, on each of which a plurality of digital/analog converters is arranged, each of the plurality of digital/analog converters being connected to an input of a plurality of crosspoint switches.

By connecting the digital/analog converters to the crosspoint switches of a particular circuit board, a greater number of pixels per control chip may be advantageously connected than existing intensity components, i.e. digital/analog converters.

Particular outputs of the plurality of crosspoint switches can be connected to a luminous element driver, which controls a luminous element of the signal generating unit, in particular a light-emitting diode or a laser diode.

Each crosspoint switch may thus advantageously control a plurality of luminous element drivers.

Particular luminous elements of the signal generating unit of each of the plurality of circuit boards can be connected to one pixel of the display panel assigned to the particular luminous element via optical waveguides.

The luminous elements may thus be advantageously arranged on the circuit board as close as possible to the luminous element drivers.

The number of luminous elements of each circuit board can be greater than the number of digital/analog converters, the crosspoint switches arranged between the digital/analog converters and the luminous element drivers of the luminous elements being designed to provide a dynamically settable, coordinate connection between the digital/analog converters and the luminous elements.

A plurality of pixels may be aggregated thereby into clusters on the display panel.

The plurality of digital/analog converters arranged on a particular circuit board can be controllable by an integrated circuit, in particular an FPGA, arranged on the particular circuit board or outside the particular circuit board.

The FPGA thus advantageously controls the aggregation of pixels into clusters on the display panel of the signal generating unit.

The integrated circuit, in particular the FPGA, can be connected to an input of each of the plurality of digital/analog converters.

All digital/analog converters of the particular circuit board may thus be advantageously controlled individually by the FPGA.

The aggregated cluster of pixels of the same intensities may be independent of a shape and/or a time delay of objects represented on the display panel within a measuring cycle of the LiDAR sensor to be tested, and the pixels aggregated into the cluster being able to be assigned to luminous elements of a plurality of circuit boards.

The aggregated clusters are thus flexibly adaptable to the objects represented on the display panel.

Each input of a crosspoint switch may be switched to a plurality of outputs of the crosspoint switch, each digital/analog converter being configured to control each luminous element.

A plurality of luminous elements or the assigned pixels may thus be advantageously aggregated into clusters by the corresponding digital/analog converters.

Each cluster generated on the display panel of the signal generating unit may be adapted in terms of its size and positioning on the display panel of the signal generating unit from measurement cycle to measurement cycle of the LiDAR sensor to be tested.

The clusters represented on the display panel may thus be adapted to particular changes of the simulated scene from frame to frame.

An object represented on the display panel of the signal generating unit may be divided into a plurality of clusters, and the display panel of the signal generating unit having a curved surface with a predefined radius.

The PACs generally have no relation to the object shape. Instead, depending on the resolution requirement, pixels having the same intensity at the same distance are combined. A PAC may also combine multiple of these groups, which differ from each other, for example, by different distances. A distinction is made between these groups in the distance direction by the ON/OFF switches of the pixels.

The curvature of the display panel advantageously permits an improved object simulation or one corresponding to a real scene.

Overlapping objects represented on the display panel of the signal generating unit in a measurement cycle, having different intensities and being situated one behind the other may be aggregated into a cluster, distances between the objects being able to be represented by switching off the pixels for a predefined period of time.

Objects situated behind each other may thus be advantageously represented on the two-dimensional display panel.

A pixel resolution and/or a number of representable intensity graduations of the display panel of the signal generating unit can correspond to at least one pixel resolution and/or a number of detectable intensity graduations of the LiDAR sensor.

The scene to be simulated may thus be represented with a full pixel resolution supported by the LiDAR sensor and/or an representable intensity graduation on the display panel.

The features of the test system for a LiDAR sensor described herein are also applicable to the method for testing a LiDAR sensor and vice versa.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
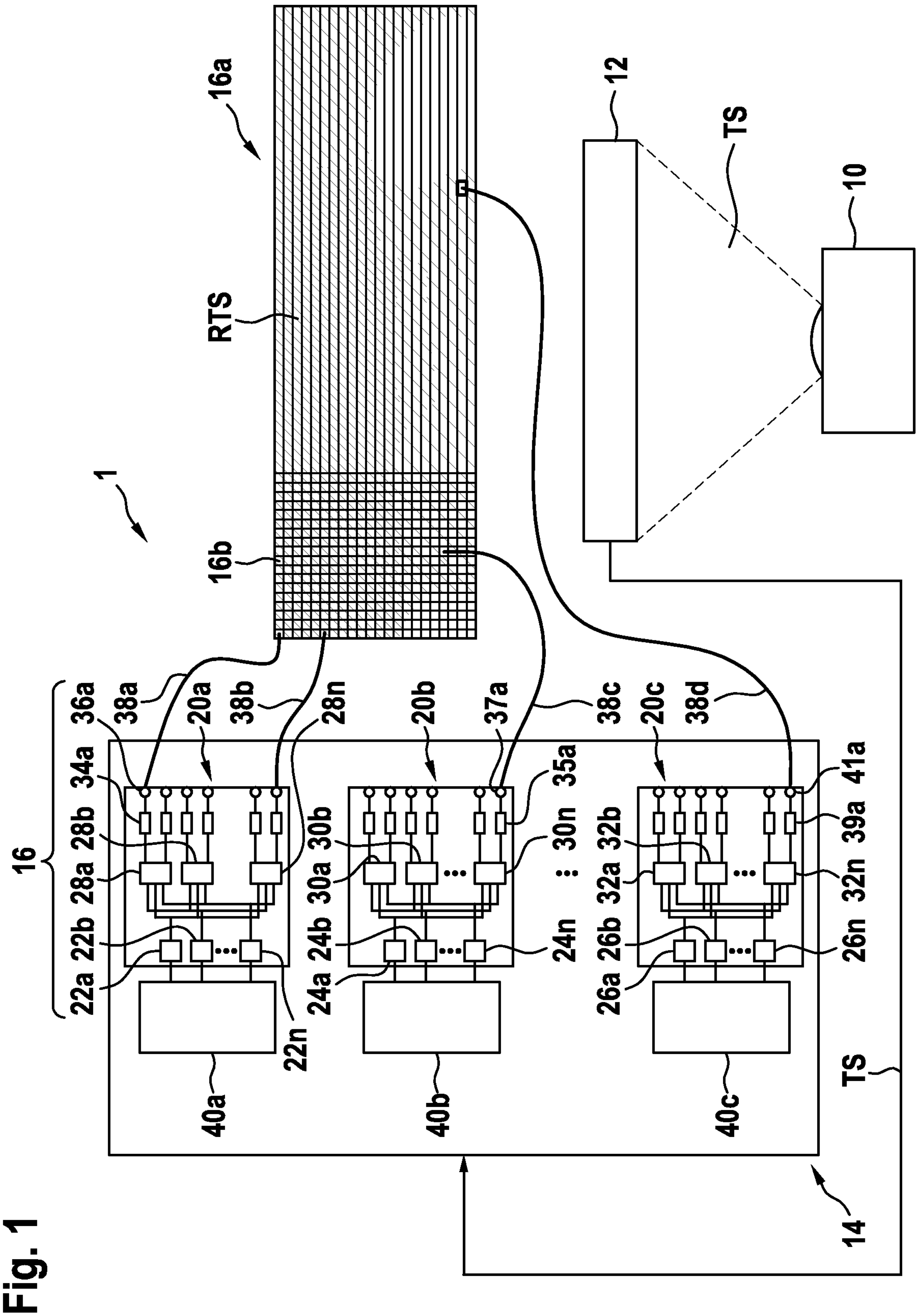
FIG. 1 shows a schematic representation of a test system for a LiDAR sensor according to an example of the invention.

The test system illustrated in FIG. 1 comprises a trigger detector 12 and a signal generator 14 connected to trigger detector 12, signal generator 14 being controlled by trigger detector 12 in response to the receipt of a trigger signal TS of a LiDAR sensor 10 to be tested, in such a way that a predefined, artificially generated optical signal RTS, in particular an artificially generated reflection of trigger signal TS, is output by a signal generating unit 16 of signal generator 14.

LIDAR Sensor 10 is designed as a flash LiDAR. Alternatively, LiDAR sensor 10 may be formed, for example, by mechanically scanning LiDAR.

Signal generating unit 16 includes a display panel 16*a* having a predefined number of pixels 16*b*. Signal generator 14 is furthermore configured to aggregate pixels 16*b* of the same intensity I into a cluster 18. The artificial scene is fed into signal generator 14 by a computing apparatus, e.g., a PC.

Signal generator 14 includes a plurality of circuit boards 20*a*, 20*b*, 20*c*, on each of which a plurality of digital/analog converters 22*a*-22*n*, 24*a-n*, 26*a-n* is arranged. Each of the plurality of digital/analog converters 22*a*-22*n*, 24*a-n*, 26*a-n* is connected to an input of a plurality of crosspoint switches 28*a-n*, 30*a-n*, 32*a-n*.

Particular outputs of the plurality of crosspoint switches 28*a-n*, 30*a-n*, 32*a-n* are connected to a luminous element driver 34*a-z*, 35*a*, 39*a*, which controls a luminous element 36*a-z*, 37*a*, 41*a* of signal generating unit 16, in particular a light-emitting diode or a laser diode.

Particular luminous elements 36*a-z*, 37*a*, 41*a* of signal generating unit 16 of each of the plurality of circuit boards 20*a*, 20*b*, 20*c* are connected to a pixel 16*b* of display panel 16*a* assigned to particular luminous element 36*a-z*, 37*a*, 41*a* via optical waveguides 38*a*, 38*b*, 38*c*, 38*d*.

Figure 2:
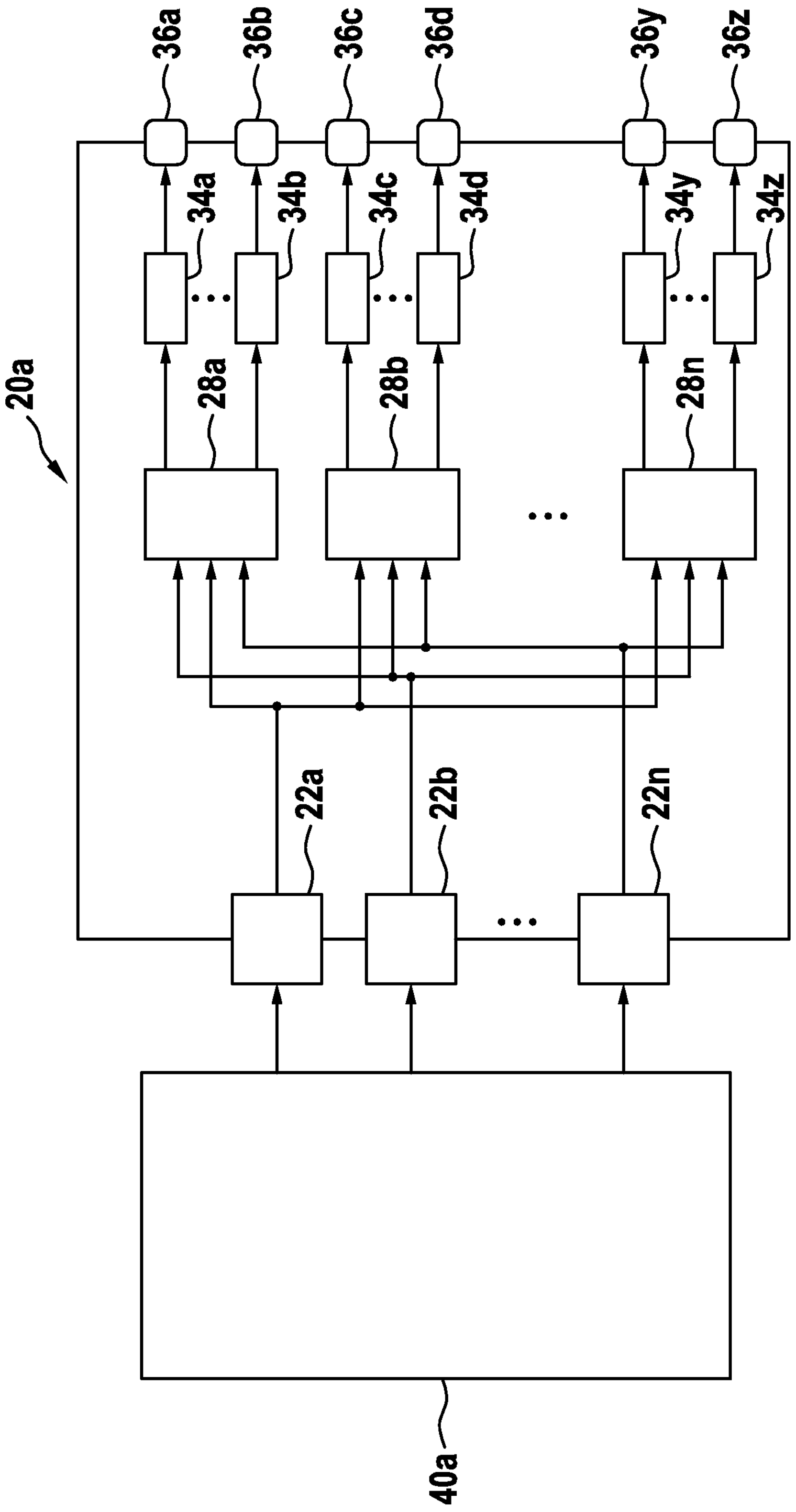
FIG. 2 shows a schematic representation of a section of the test system for a LiDAR sensor according to the example.

FIG. 2 shows a schematic representation of a section of the test system for a LiDAR sensor according to the preferred specific embodiment of the invention.

The number of luminous elements 36*a-z* of circuit board 20*a* is greater than the number of digital/analog converters 22*a*-22*n*. Crosspoint switches 28*a-n* arranged between digital/analog converters 22*a*-22*n* and luminous element drivers 34*a-z* of luminous elements 36*a-z* are furthermore designed to provide a dynamically settable coordinate connection between digital/analog converters 22*a*-22*n* and luminous elements 36*a-z*.

The plurality of digital/analog converters 22*a*-22*n* arranged on circuit board 20*a* is controllable by an integrated circuit 40*a*, in particular a field-programmable gate array (FPGA), arranged outside circuit board 20*a*.

Alternatively, the plurality of digital/analog converters 22*a*-22*n* arranged on circuit board 20*a* may be controllable by an integrated circuit 40*a*, in particular an FPGA, arranged, for example, one circuit board 20*a*.

Each input of a crosspoint switch 28*a-n* is switchable to a plurality of outputs of crosspoint switches 28*a-n*.

Each digital/analog converter 22*a*-22*n* is configured to control each luminous element 36*a-z*.

The control of which pixels are to be active at which point in time and in which intensity is implemented in the integrated circuit, in particular the FPGA. The corresponding digital signal of the surroundings simulation generated by the computing apparatus is first converted into an analog signal and then used as the input signal for luminous element driver 34*a-z*.

The invention is based on the finding that it is not at all necessary to use as many different intensity values as existing sensor pixels. The goal of pixel panel or display panel 16*a* is to emulate a point cloud, which LiDAR sensor 10 sees in real use.

Viewing a point cloud as the simulation result to be achieved leads to the finding that only a limited number of different intensity values need to be depicted.

A cluster 18 or pixel aggregation cluster is defined by luminous elements 36*a-z* belonging to an intensity cluster.

Viewed globally, multiple digital/analog converters 22*a*-22*n* per cluster 18 may thus also supply the same intensity value. This then implies that the entire display panel may theoretically be one large cluster 18.

However, a cluster 18 does not have to have anything to do with the shape of an object. The associated luminous elements may be situated anywhere, they need only to have the same intensity value at the same point in time during the feeding of the scene.

Signal generating unit 16 is designed in such a way that the intensity value of the aggregated pixels may vary from distance to distance. Pixel enable signals are provided for a sub-selection of the pixels at a distance. Clusters 18 are redefined from scene to scene or from frame to frame of the surroundings simulation.

There are only as many intensities as digital/analog converter channels at one point in time, i.e., at a distance from the sensor; however, they may then be selected arbitrarily. Even if only a few intensities are available overall, they are generally sufficient.

It is advantageous that certain regions may have a higher resolution, i.e., more intensities per pixel surface area, while other regions have a lower resolution. This assignment may be dynamically varied from scene to scene.

Figure 3:
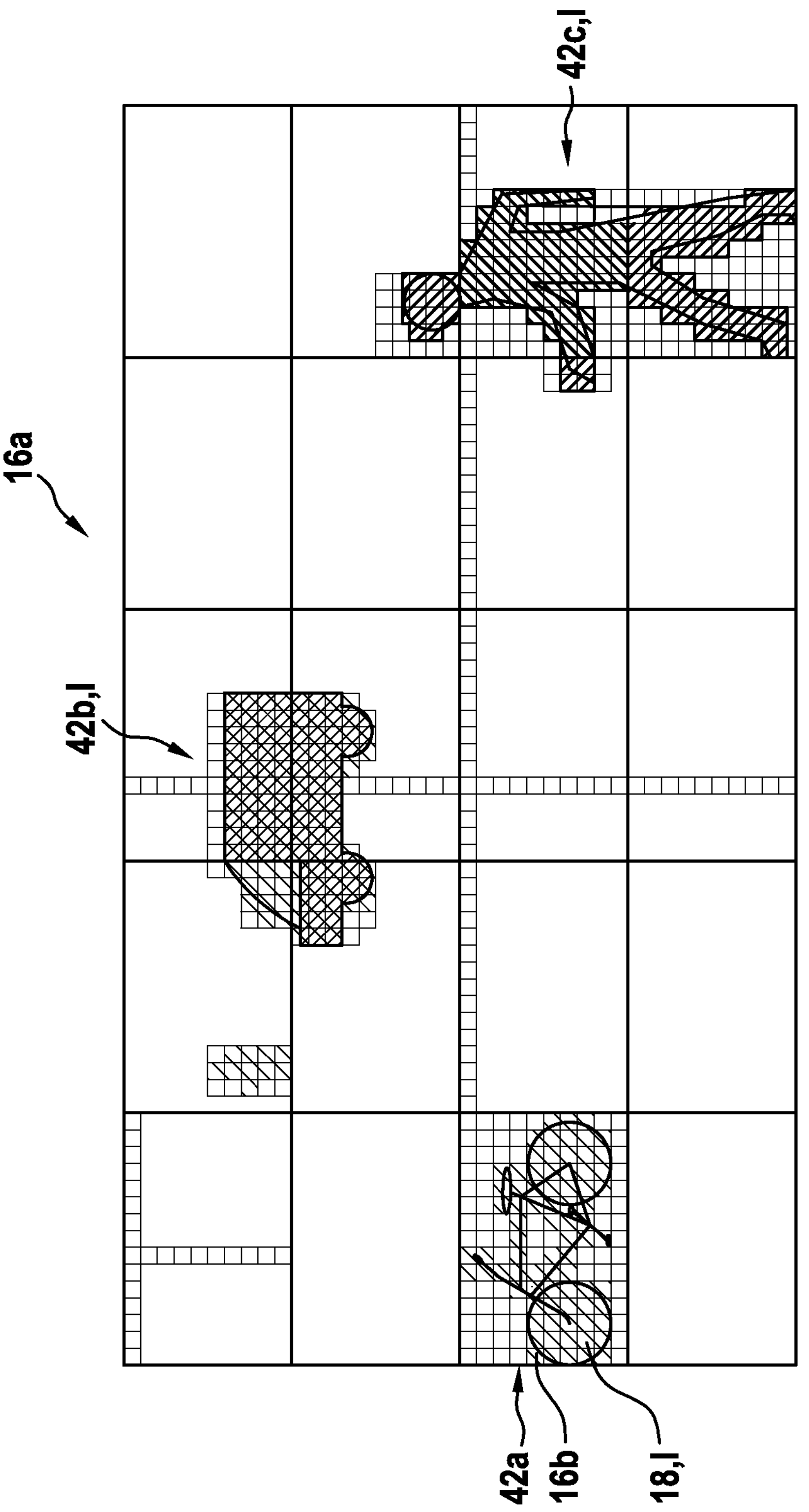
FIG. 3 shows a schematic representation of a display panel of a signal generating unit according to the example.

FIG. 3 shows a schematic representation of a display panel of a signal generating unit according to the preferred specific embodiment of the invention.

Aggregated cluster 18 of pixels 16*b* of the same intensity I is independent of a shape and/or a time delay of objects 42*a*, 42*b*, 42*c* represented on display panel 16*a* within a measurement cycle of LiDAR sensor 10 to be tested.

Moreover, pixels 16*b* aggregated into cluster 18 may be assigned to luminous elements 36*a-z*, 37*a*, 41*a* of a plurality of circuit boards 20*a*, 20*b*, 20*c*. Each cluster 18 generated on display panel 16*a* of signal generating unit 16 may be adapted in terms of its size and positioning on display panel 16*a* of signal generating unit 16 from measurement cycle to measurement cycle of LiDAR sensor 10 to be tested.

An object 42*a*, 42*b*, 42*c* represented on display panel 16*a* of signal generating unit 16 may be divided into a plurality of clusters 18.

Display panel 16*a* of signal generating unit 16 preferably has a planar surface. Alternatively, display panel 16*a* of signal generating unit 16 may have a curved surface with a predefined radius.

Overlapping objects 42*a*, 42*b*, 42*c*, which are represented on display panel 16*a* of signal generating unit 16 in a measurement cycle, have different intensities I and are situated one behind the other, may be aggregated into a cluster 18. Distances between objects 42*a*, 42*b*, 42*c* may be represented by switching off pixels 16*b* for a predefined period of time.

A pixel resolution and/or a number of representable intensity graduations of display panel 16*a* of signal generating unit 16 correspond(s) to at least one pixel resolution and/or a number of detectable intensity graduations of LiDAR sensor 10.

Different intensities may be generated either from distance to distance or from cluster 18 to cluster 18. A pixel region of display panel 16*a* controllable by a circuit board may be identified as a black frame. The functionality may be recognized based on the example of the pedestrian in the front right region of the image as the target and an overlapping of the target over multiple circuit boards.

The head has a medium-high intensity, the body a high intensity, the legs a medium intensity and the hand a low intensity. The intensity is associated with the reflectivity of the target surface and the distance from the sensor.

The truck may also be effectively represented, depending on its position in the image region, in that the upper glassed-in cab may be delimited from the rest of the truck, which has a metallically high reflectivity.

The lower part of the truck is a cluster 18 of uniform intensity and extends over two circuit boards.

The depiction of the simulated distance of an object is shown by the time delay of the signal emitted by the pixels. Objects having different distances, which are then represented by pixel panel 16*a* at different points in time, may thus occur in one scene.

The intensity values may still be varied between the different distances, or pixels may be switched off by enable signals. Due to the long switching times of crosspoint switches 28*a-n*, 30*a-n*, 32*a-n*, a variation of clusters 18 may take place only after each measurement cycle of sensor 10. Within the scope of these restrictions, even objects situated one behind the other at different distance from sensor 10 may be represented by the same pixels 16*b*.

Figure 4:
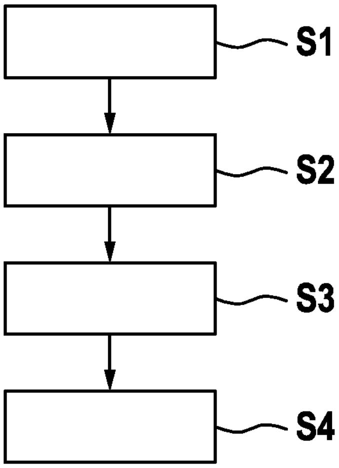
FIG. 4 shows a flowchart of a method for testing the LiDAR sensor according to the example.

FIG. 4 shows a flowchart of a method for testing the LiDAR sensor according to the preferred specific embodiment of the invention.

The method comprises a provision S1 of a trigger detector 12 and a signal generator 14 connected to trigger detector 12.

In addition, the method comprises a provision S2 of a display panel 16*a* of a signal generating unit 16 of signal generator 14, which has a predefined number of pixels 16*b*.

The method also comprises a control S3 of signal generator 14 by trigger detector 12 in response to the receipt of a signal of a LiDAR sensor 10 to be tested, in such a way that a predefined optical signal generated by a computing apparatus, in particular, an artificially generated reflection of a LiDAR sensor signal, is output by signal generating unit 16 of signal generator 14.

The method further comprises an aggregation S4 of pixels 16*b* of the same intensity I into a cluster 18, using signal generator 14.

Although specific embodiments have been illustrated and described herein, it is understandable to those skilled in the art that a multiplicity of alternative and/or equivalent implementations exist. It should be noted that the exemplary embodiment or exemplary embodiments is/are only examples and are not used to limit the scope, the applicability or the configuration in any way.

Rather, the aforementioned summary and detailed description provide those skilled in the art with a convenient set of instructions on the implementation of at least one exemplary embodiment, it being understandable that different modifications in the range of functions and the arrangement of the elements may be carried out without deviating from the scope of the attached claims and their legal equivalents.

This application generally intends to cover changes and adaptations or variations in the embodiments illustrated herein.

The LiDAR sensor may be formed, for example, by a mechanically rotating, scanning LiDAR. In this case, display panel 16*a* of signal generating unit 16 would be arranged at an angle of 360° around LiDAR sensor 10.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A test system for a LiDAR sensor, the test system comprising: a trigger detector; and a signal generator connected to the trigger detector, wherein the signal generator is controlled by the trigger detector in response to the receipt of a trigger signal of the LiDAR sensor to be tested, such that an artificially generated reflection of the trigger signal is output by a signal generating unit of the signal generator, the signal generating unit including a display panel having a predefined number of pixels, and the signal generator being configured to aggregate pixels of the same intensity into a cluster.

2. The test system according to claim 1, wherein the signal generator includes at least two circuit boards, on each of which a plurality of digital/analog converters is arranged, each of the plurality of digital/analog converters being connected to an input of a plurality of crosspoint switches.

3. The test system according to claim 2, wherein particular outputs of the plurality of crosspoint switches are connected to a luminous element driver controlling a luminous element of the signal generating unit or a light-emitting diode or a laser diode.

4. The test system according to claim 3, wherein particular luminous elements of the signal generating unit of each of the plurality of circuit boards are connected to pixels of the display panel assigned to one of the particular luminous element via optical waveguides.

5. The test system according to claim 3, wherein the number of luminous elements of each circuit board is greater than the number of digital/analog converters, wherein the crosspoint switches arranged between the digital/analog converters and the luminous element drivers of the luminous elements are designed to provide a dynamically settable, coordinate connection between the digital/analog converters and the luminous elements.

6. The test system according to claim 2, wherein the plurality of digital/analog converters arranged on a particular circuit board may be controlled by an integrated circuit or an FPGA arranged on the particular circuit board or outside the particular circuit board.

7. The test system according to claim 6, wherein the integrated circuit or the FPGA is connected to an input of each of the plurality of digital/analog converters.

8. The test system according to claim 2, wherein the aggregated cluster of pixels of the same intensity is independent of a shape and/or a time delay of objects represented on the display panel within a measurement cycle of the LIDAR sensor to be tested, and wherein the pixels aggregated into the cluster are assigned to luminous elements of a plurality of circuit boards.

9. The test system according to claim 2, wherein each input of a crosspoint switch is switchable to a plurality of outputs of the crosspoint switch, and wherein each digital/analog converter is configured to control each luminous element.

10. The test system according to claim 1, wherein each cluster generated on the display panel of the signal generating unit is adapted in terms of its size and positioning on the display panel of the signal generating unit from measurement cycle to measurement cycle of the LiDAR sensor to be tested.

11. The test system according to claim 1, wherein an object represented on the display panel of the signal generating unit is divided into a plurality of clusters and the display panel of the signal generating unit includes a curved surface having a predefined radius.

12. The test system according to claim 1, wherein overlapping objects represented on the display panel of the signal generating unit in a measurement cycle, having different intensities and being situated one behind the other are aggregated into a cluster, and wherein distances between the objects are able to be represented by switching off the pixels for a predefined period of time.

13. The test system according to claim 1, wherein a pixel resolution and/or a number of representable intensity graduations of the display panel of the signal generating unit correspond(s) to at least one pixel resolution and/or a number of detectable intensity graduations of the LiDAR sensor.

14. A method for testing a LiDAR sensor, the method comprising: providing a trigger detector and a signal generator connected to the trigger detector; providing a display panel of a signal generating unit of the signal generator, which has a predefined number of pixels; controlling the signal generator by the trigger detector in response to a receipt of a signal of a LiDAR sensor to be tested such that an artificially generated reflection of the LiDAR sensor signal, is output by the signal generating unit of the signal generator; and aggregating pixels of the same intensity into a cluster using the signal generator presentable intensity graduations of the display panel of the signal generating unit correspond(s) to at least one pixel resolution and/or a number of detectable intensity graduations of the LiDAR sensor.

15. The test system according to claim 1, wherein the signal generator includes at least two circuit boards.

16. The test system according to claim 15, further comprising on each of which a plurality of digital/analog converters arranged on each of the at least two circuit boards.

17. The test system according to claim 16, wherein each of the plurality of digital/analog converters is connected to an input of a plurality of crosspoint switches.

18. A test system for a LiDAR sensor, the test system comprising: a trigger detector; and a signal generator connected to the trigger detector, wherein the signal generator is controlled by the trigger detector in response to the receipt of a trigger signal of the LiDAR sensor to be tested, such that a predefined, artificially generated optical signal or an artificially generated reflection of the trigger signal is output by a signal generating unit of the signal generator, the signal generating unit including a display panel having a predefined number of pixels, and the signal generator being configured to aggregate pixels of the same intensity into a cluster, wherein the signal generator includes at least two circuit boards, on each of which a plurality of digital/analog converters is arranged, each of the plurality of digital/analog converters being connected to an input of a plurality of crosspoint switches.

* * * * *